United States Patent Office 3,197,951
Patented Aug. 3, 1965

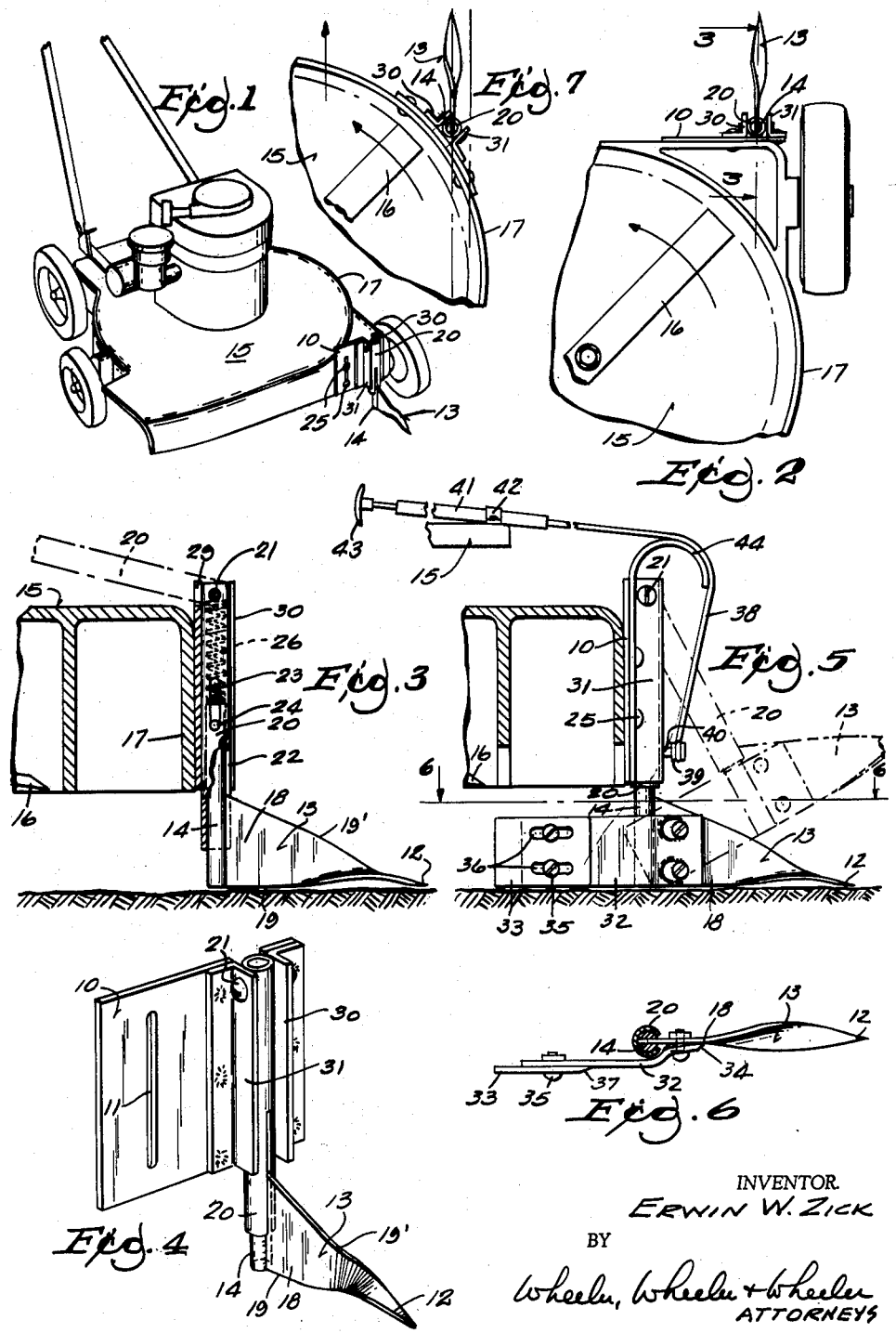

3,197,951
GRASS-ERECTING ATTACHMENT FOR A LAWN MOWER
Erwin W. Zick, Beaver Dam, Wis.
(918 E. Frances St., Appleton, Wis.)
Filed June 1, 1964, Ser. No. 371,249
4 Claims. (Cl. 56—255)

This invention relates to a grass-erecting attachment for a lawn mower.

The invention consists of a twisted grass-erecting blade which is vertically reciprocable and is spring pressed to a position adjacent the ground. The blade is mounted in a housing which is capable of being swung away from its ground engaging position to an inactive position where it may be stored while not in use. The invention also includes an extension blade which may be used to maintain the grass in erected position until it is contacted by the cutting means of the mower. The mower is here shown as a rotary mower, for ease of illustration, but the invention is equally applicable to a reel type mower or to other cutting structures.

The purpose of the invention is to provide means for raising the grass along the margin of a lawn to an upright position so that it may be trimmed to the proper length. In the center of a lawn, the grass generally grows erect. At the edges of the lawn, however, the grass has a tendency to grow horizontally. In that position, it cannot be cut by a mower blade set a fixed distance from the ground. This produces unsightly edges which must be trimmed by other means. The device of my invention includes a twisted blade which passes beneath the blades which are horizontally disposed. Because of the twist in the blade, the grass is brought to an erect position. Under some circumstances, the grass will maintain this erect position long enough to be contacted by the cutting blade of the mower, in which case nothing further is needed. In the event that the grass will not stay erect, a supplementary blade may be attached as shown in FIGURES 4 and 6 to extend the vertical portion of the blade to a point in close proximity to the cutter. I also provide an adjustment to vary the length of the supplementary blades, so that it may be adjusted for use on a particular mower in such a manner as to keep the grass erect until the cutting means is very near, without interfering with the cutting means.

I also provide means for retracting my grass erecting blade to an inactive position, in which position it is protected against striking obstacles. This is important because my device is primarily useful at the edge of a lawn, so far as most species of grass are concerned. If left in place constantly, it would constitute a projection which would limit the maneuverability of the lawn mower.

In the drawings:

FIG. 1 is a perspective view of a lawn mower to which my attachment is secured.

FIG. 2 is a fragmentary bottom plan view of a lawn mower bearing the attachment of my invention.

FIG. 3 is a cross-sectional view on line 3—3 of FIG. 2.

FIG. 4 is a perspective view of my attachment shown separately from the lawn mower and greatly enlarged.

FIG. 5 is a view similar to FIG. 3 showing modifications of my device.

FIG. 6 is a view on line 6—6 of FIG. 5.

FIG. 7 is a bottom plan view of my device applied to a different portion of a lawn mower than that shown in other views.

As shown in the drawings, my attachment consists of a base plate 10 provided with slots 11 to receive attaching means such as bolts, to secure the device to a mower. A twisted triangular blade 13 having a horizontal tip 12 and a vertical portion 18 is mounted on vertically reciprocable shaft 14. The tip 12 is slightly higher than the bottom margin 19 at vertical portion 18, preventing tip 12 from digging in despite ground contact, or near contact, below flat vertical portion 18. Between 12 and 18, the margin 19 rises still higher, being concave toward the ground because of the twist in blade 13. This assists in raising the grass initially, before upper margin 19' begins to rise steeply (see FIG. 3).

A guide tube 20 receives shaft 14 slidably. It is provided with a slot 22 within which blade 13 reciprocates, the walls of the slot serving to maintain orientation of the axis of the blade 13. One side of the tube 20 is also provided with a short slot 23 to receive guide pin 24 mounted on shaft 14, which limits the downward motion of blade 13. The lowermost position of the blade is determined by adjusting base plate 10 on slots 11 as shown in FIG. 1. The bolts 25 may be loosened to position the base plate with blade 13 in the proper relationship to the ground, after which bolts 25 are tightened. Stop pin 24 then maintains the pre-set position, but permits blade 13 to ride over obstructions. At all times the blade 13 is urged downwardly by a spring 26 within tube 20 which pushes on the upper end of shaft 14 to urge stop pin 24 against the end of slot 23. The upper end of spring 26 is kept within tube 20 by pivot 21, which crosses tube 20 above the spring 26.

Lateral support for tube 20 is provided by guides 30 and 31 which extend at right angles to base plate 10 and which provide a place for mounting pivot 21. As seen in FIG. 7, it is possible without any change in the construction other than alignment of the hole for pivot 21 in tube 20 to provide for orientation of blade 13, since the lower end of guides 31 is well above the normal position of the top of blade 13. In the case of a reel type mower, it may be desirable to mount base plate 10 parallel to the path of travel and turn guide tube 20 so that the blade 13 is also parallel to the path of travel and substntially aligned with the end of the reel. Since the device is intended for use primrily at the edge of a lawn, the reel or cutting blade 16 should project only slightly beyond the axis of blade 13. Whatever type of mower is used, the same considerations apply, my device preferably being mounted very close to the edge of the area which is cut.

As shown in FIGS. 5 and 6, my device may also be provided with one or more extensions 32, 33 which abut blade 13 at 34 and extend rearwardly generally parallel to the axis of blade 13, to maintain the grass erect until it is engaged by a cutter such as blade 16. The first extension 32 passes to one side of shaft 14 and guide tube 20 (FIGS. 5 and 6). If a second extension 33 is required, it may be secured to extension 32 by means of bolts 35. The openings for bolts 35 may be slotted as shown at 36 to provide for adjustment of extension 33 with respect to extension 32. If desired, the margins of extensions 32 and 33 may be bevelled at 34 and 37 to provide a smoother surface to guide the grass blades.

Preferably my device is so mounted on the mower that the axis of the blade, from the tip 12 to the shaft 14, is aligned with the normal direction of travel of the mower, regardless of the type of mower or the shape of the mower housing (see FIG. 7). The blade axis (extended) should pass through the area being cut, preferably near the edge of the cut. In a rotary mower the blade axis will lie close to a longitudinal tangent to the path of the blade tip 16 (FIG. 7). As shown in the drawings, the mower housing 15 encloses a single cutting blade 16 rotating in a horizontal plane and surrounded by a generally circular wall 17 which is part of housing 15. As shown in FIG. 1, some mower housings 15 are provided with a generally laterally extending front wall on which my device may be mounted, but as shown in FIG. 7, it may be necessary to mount my device on the circular wall 17 in some cases. The form of my device lends itself to such mounting, as shown in FIG. 7.

A vertical guide tube 20 receives shaft 14, and is pivoted at 21 to flanges 30, 31 on base plate 10. Tube 20 may be oriented in any direction with respect to the base plate 10, merely by changing the orientation of pivot 21. Whichever way blade 13 is turned, tube 20 is pivoted parallel to base 10 at pivot 21. If needed, a notch 29 may be provided in plate 10 adjacent to pivot 21 to permit tube 20 to swing to an inoperative position in which the tip 12 of blade 13 is safely reversed to point toward the mower.

I may also provide remotely operated means for retracting guide tube 20 and blade 13 from operative position, as shown in FIG. 5. Such retraction means may include a flexible wire 38 secured at 39 to tube 20. If desired, attachment point 39 may be spaced outwardly from tube 20 by means of a post 40 to provide better leverage for lifting my device. The sheath 41 for flexible wire 38 may be secured to any fixed portion of the mower, as by clip 42, and a conventional actuating handle 43 may be provided at some point accessible to the operator. If wire 38 is provided, it is desirable to provide a guide 44 over which the wire passes while the tube 20 is in its operative position, in order that the wire 38 may pull upwardly and forwardly on attaching point 39 during the first portion of the retraction movement. The guide 44 may be formed by an extension of one of the guides 31 which normally holds tube 20 against lateral movement, as shown in FIG. 5. Also, as shown in FIG. 5, the heel of blade 13, extension 32, or extension 33 will usually engage the ground if the mower is pulled back by the operator, causing the blade 13 and tube to swing forwardly about pivot 21 to the dotted line position of FIG. 5, after which it is easy for the operator to complete the retraction of the attachment to the inoperative position (shown fragmentarily in FIG. 3 in dotted lines) by pulling knob 43. To restore my device to operative position, the operator simply pushes knob 43. When the blade 13 touches the ground, the mower is pushed forward, completing the movement of blade 13 to operative position. The operator need not endanger his fingers at any time, even if wire 38 is not employed, because of the fact that moving the mower is effective to pivot tube 20 about pivot 21 when it is close to blade 16.

Thus it will be seen that I have provided a versatile and effective means for erecting the grass in the path of a mower where such grass is growing horizontally, and for retracting my device when it is not needed.

I claim:

1. An attachment for a lawn mower comprising a twisted blade having a substantially flat vertical portion, a laterally and forwardly inclined portion, and a generally horizontal tip, a mounting bracket, guide means adapted to hold said blade in vertically reciprocable relation to said bracket, and a pivotal connection between said guide means and said mounting bracket, said pivotal connection being adapted to permit said blade to swing in an arc between a lower operative position and an upper inoperative position, said mounting bracket including a vertical flange and a mounting plate normal to said flange, said guide means comprising a tube, said blade having a shaft vertically reciprocable in said tube, said tube being provided with a vertical slot and said shaft being provided with a stop pin extending into said slot, and a spring within said tube and bearing on said shaft adapted to urge said shaft downwardly in said tube.

2. The device of claim 1 in which the heel portion of said blade is provided with a ground-engaging corner having a substantially vertical edge at the rear margin of said blade.

3. The device of claim 1, the blade further comprising a separable rearward extension of the vertical portion of said blade, the rearward extension being adjustable in length.

4. In combination, a lawn mower having cutting means, and an attachment comprising a mounting bracket, means for attaching said bracket to said lawn mower, vertical guide means mounted on a pivot adjacent the top of said bracket and extending downwardly therefrom, and a twisted triangular grass-erecting blade vertically reciprocable in said guide means, said blade being oriented along an axis generally parallel to the normal direction of movement of said mower and at one side of a forward extension of the swath cut by said mower, said blade being provided with a substantially flat vertical portion adjacent to said guide means, a laterally and forwardly inclined portion, and a horizontal forwardly directed tip portion, said blade being urged downwardly with respect to said guide means by resilient means acting between said pivot and said blade, and stop means limiting the downward movement of said blade, a flexible wire having a sheath anchored to a point which is fixed with respect to said mower and a wire reciprocable in said sheath, one end of said wire being secured to said vertical guide means remote from said pivot, wire guide means extending forwardly from the top of said mounting bracket, said guide means being adapted to support said wire forwardly of said vertical guide means.

References Cited by the Examiner

UNITED STATES PATENTS

| | | | |
|---|---|---|---|
| 1,005,169 | 10/11 | Daugherty | 56—314 |
| 1,349,809 | 8/20 | Bronnum | 56—249 |
| 1,800,166 | 4/31 | Wallen. | |
| 1,921,952 | 8/33 | Stemman | 56—314 |
| 2,472,414 | 6/49 | Geater | 56—25.4 |
| 2,537,727 | 1/51 | Witte | 56—256 |
| 2,701,434 | 2/55 | Christopherson | 56—314 X |
| 2,782,583 | 2/57 | Oberle | 56—25.4 |
| 2,892,298 | 6/59 | Chaney | 56—314 |
| 2,909,021 | 10/59 | McLane | 56—255 X |

FOREIGN PATENTS 243,164  2/63  Australia.

ABRAHAM G. STONE, *Primary Examiner.*

RUSSELL R. KINSEY, ANTONIO F. GUIDA,
*Examiners.*